INVENTOR
JAMES EMMETT CLAYTON
BY J. Donald Weber, Jr.
AGENT

United States Patent Office 3,192,480
Patented June 29, 1965

3,192,480

COMPATIBILITY CIRCUIT FOR ACCOMMODATING MACHINES OF DIFFERENT MEMORY STORAGE CAPACITIES EMPLOYING PENTODE AS GATED-AMPLIFIER

James Emmett Clayton, Ambler, Pa., assignor to Sperry Rand Corporation, New York, N.Y., a corporation of Delaware Filed Nov. 16, 1961, Ser. No. 152,759
6 Claims. (Cl. 328—91)

This invention relates to a circuit which may be used by at least one of a plurality of different machines, as for example digital computers, whereby a single input apparatus may be utilized even though the machines use somewhat different coding instructions.

Because of the expanding state of the business machine or computer industry, new innovations and revelations are introduced and developed virtually all of the time. Many of these innovations render previous equipment virtually obsolete. Consequently, the ultimate consumer, the purchaser or lessor of the machines, is sometimes faced with the perplexing and economically vexing problem that all of the records associated with the business or the like, for which these machines are used, are in the form of information which may be stored on magnetic tapes, punch cards, paper tape or the like. Moreover, this important information is stored in the storage medium in accordance with the programming and/or logic system utilized in the machine. Therefore, when a new machine appears on the market the consumer is, or at least may be, precluded from purchasing or leasing a newer machine because the information stored previously will not be compatible with the new machine even though the newer machine could possibly provide certain advantageous operations because the newer machine includes certain innovations therein in the logical scheme or programming thereof. Thus, for example, if a change is made in the instruction word which is utilized by the machine, the timing of the logic circuit may be incorrect to handle the new words. For example, the structure word may be lengthened, or shortened, or even though maintained in the same length, different bit or digit portions of the word may assume different significance.

In particular, the common instruction word utilized in computing machines, as for example, the Univac I and Univac II machines, comprise a plurality of digits. Each of these digits is made up of a plurality of binary bits. The digits which comprise the instruction word are classified as Operation Code Digits and Memory Address Code Digits. Since the Univac I machine has a smaller memory capacity than the Univac II machine, the memory code digits of the instruction word used in the Univac I comprise a smaller number of digits than is the case in the Univac II. Thus, when an instruction word is applied to the central computer of the machine via the input apparatus, provision must be made in the Univac II to hold open the input gate thereto in order to permit the proper number (for example four) memory digits to be stored. Since another machine (e.g. Univac I) may require a smaller number of memory digits (for example three digits), certain other digits are included in the instruction word between the operation code and the memory address code. These digits are not decoded because the memory address decoder is permissed only for the time required to handle the three memory address digits. Because of the larger memory storage capacity in the Univac II, the memory address code digits required are larger in number than in Univac I. If the information supplied by the input apparatus is programmed properly for the Univac II, there is no problem; however, if the input apparatus provides information which is programmed and coded in the Univac I mode of operation, and attempts to supply this information to the Univac II, it will be seen that since the decoder of the memory address code is permissed for a longer time period, irrelevant information will be decoded thereby such that an incorrect memory address will be produced. Thus, it is required that a compatibility circuit be inserted between the input apparatus and Univac II. This compatibility circuit serves the function of controlling the permissive signal applied to the decoder in the Univac II whereby a shorter permissive signal is applied when the Univac II is operating in the Univac I mode, that is, when the Univac II is being supplied by information coded in the Univac I code. On the other hand, however, the compatibility circuit provides a normal permissive signal to the Univac II when that machine is operating in the Univac II mode or is being supplied by input information which is coded or programmed for that machine.

Various types of compatibility circuits are conceivable. However, some of these circuits require large scale logic circuits and a large number of logical components. A preferred compatibility circuit is shown by this invention to utilize a beam power pentode tube as a gated-amplifier. By supplying separate signals to the various electrodes thereof, the gated amplifier may be regulated such that the conductive state thereof is indicative of the mode of operation of the input apparatus whereby the machines being used may have the decoder thereof permissed for the proper length of time.

One object of this invention is to provide a circuit which renders machines of different memory storage capacities compatible with common input apparatus.

Another object of this invention is to provide a compatibility circuit wherein a beam power pentode tube operates as a gated-amplifier.

Another object of this information is to provide such a gated-amplifier device in a compatibility circuit whereby the number of stages and electrical components is reduced.

These and other objects and advantages of this circuit will become more readily apparent hereinafter during the detailed description of a preferred embodiment of the invention and its operation as illustrated by the accompanying drawings in which.

Figure 1:
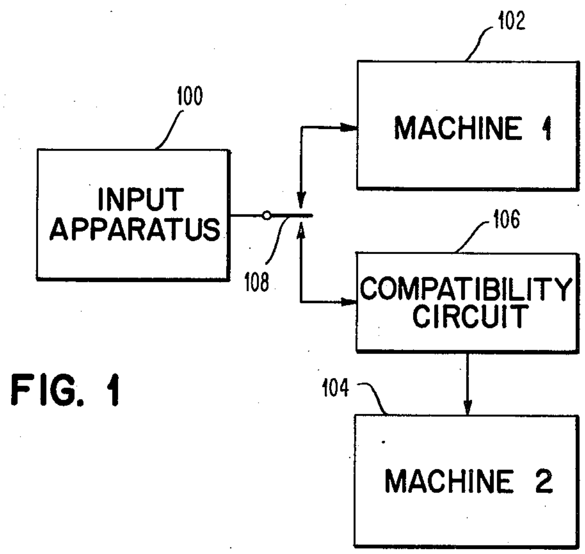
FIGURE 1 is a block diagram of the typical system which utilizes the compatibility circuit which is the subject of this invention.

Referring now to FIGURE 1, there is shown an input apparatus 100 which is alternatively coupled to a first machine 102 or to the compatibility circuit 106 via the switch 108. The compatibility circuit 106 is connected to a second machine 104. It is to be understood of course, that the component 108 may be any of the known switches and in fact may merely be a "plug in" unit whereby the input apparatus 100 may be plugged into machine 102 or compatibility circuit 106, independently. However, this type of interconnection is left to the particular mode of operation desired especially since it is not critical to the operation of the invention per se.

By the input apparatus 100, is meant not only the hardware but the soft-ware as well. That is, the input apparatus may comprise tape handlers, card sorters, paper tape, or the like, type of equipment as the hardware. It is to be understood, that although it is often not stressed, the input apparatus in this device is to include the soft-ware properties.

The block 102 is to be representative of the central computer component of a computing machine. Likewise, block 104 is representative of the central computer component of another computing machine. The compatibility circuit 106 which is connected between the input apparatus 100 and machine 104 is the particular circuit which is the subject of this invention. The workings of this circuit will be described more fully subsequently.

FIGURE 1 is a block diagram which as usual, is utilized to show the operation of the overall system within which the specific circuit is utilized. Thus, as described supra, block 100 is representative of the input apparatus—including both soft-ware and hardware. The switch 108 is representative of the fact that the input apparatus 100 may be fed to the central computer of machine 102 or the central computer of machine 104 only in a mutually exclusive mode. That is, only one of the central computers 102 or 104 can be connected to the input apparatus at one time. Moreover, the flow chart of FIGURE 1 indicates that in order to be connected to the central computer of machine 104 the information from the input apparatus 100 must be fed through the compatibility circuit 106. Though FIGURE 1 does not relate per se to the invention, it is deemed desirable to indicate the method in which the circuit, which represents the subject of the invention, is to be utilized.

Figure 2:
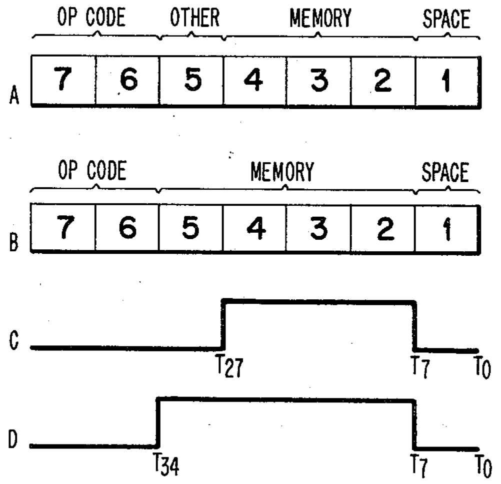
FIGURE 2 (A through D) represents diagrammatically, the instruction words and permissive signals supplied to the different machines.

Referring now to FIGURE 2, there is shown graphically a representation of the instruction words utilized in machines 102 and 104, as well as the permissive signals which are provided in order to permit the instruction words to pass through particular gates in the specific machines. In particular, the instruction words which are utilized in the system are shown in lines A and B. The instruction word utilized in conjunction with machine 102 is shown in line A. The instruction word comprises only six digits. The seventh digit is utilized to provide the spacer between adjacent instruction words. (It is to be understood that this explanation is exemplary only and that an instruction code pair may include one or more instruction words in series and with only a single spacer digit.) For purposes of explanation, the digits are numbered 1 through 7 from right to left. This is to indicate that the space bits are passed through the machine first with the Least Significant Digit (digit number 2) passed therethrough next. This sequential operation continues until the Most Significant Digit (digit number 7) is passed through the system whereupon a further instruction word may be provided. The further instruction word or code pair again is instituted by a space digit. In the Univac machines, for example, the code which has been instituted requires that the instruction word comprises 13 digits (two serial 6 digit words and a spacer, see supra). Each of the digits is made up of seven binary bits. For sake of simplicity, however, the code will be assumed to require only 7 digits—a 6 digit word and a spacer. Thus, assigning a time period to each individual bit and starting at time $t_0$, the first digit or space is initiated at time $t_0$; digit number 2 is initiated at time period $t_7$, etc.; until a second instruction word is inserted.

The instruction word for machine 104 is shown in line B and has a substantially similar code format. That is, the exemplary instruction word comprises seven digits including one space digit each of which digits includes seven binary bits. However, it will be seen that the instruction word for machine 102 as shown in line A incorporates a memory address code utilizing only three digits namely digits 2, 3 and 4. On the other hand, the instruction word for machine 104 is shown in line B and incorporates a four digit memory address code. That is, in the second instruction word the memory address code utilizes digits 2, 3, 4 and 5. The fifth digit utilized in the instruction word of machine 102 is utilized for other purposes. The necessity for a larger memory address code in the instruction word of line B is created since the instruction word utilized in the second machine must be able to identify at least 2,000 (0–1999) memory address positions, whereas the instruction word utilized in the first machine must identify only 1,000 (0–999) memory address locations. Consequently, it may be seen that if the second instruction word is fed into the machine which normally utilizes the first instruction word, there will be no problem insofar as memory addresses designated by addresses less than 1,000 are concerned. That is, a permiss signal which permits the instruction word to be operated on by machine 102 will be such that only digits 2, 3 and 4 of any instruction word will be decoded. Thus, when the second instruction word is utilized digit number 5 will be ignored by the machine as, for example by having a gate inhibited after digit number 4 is provided. On the other hand, however, if an instruction word is applied to a machine normally utilizing instruction words having formats such as the instruction word of line B, a serious problem can arise. That is, the instruction word of line A utilizes only digits 2, 3 and 4 for the memory address location. In addition, digit number 5 is utilized for other miscellaneous or predetermined coded information. If this information is provided to machine 104 which is adapted to receive information from digits 2, 3, 4 and 5 in order to indicate the memory address location, the "other" information indicated by digit number 5 of the instruction word will be interpreted and decoded by machine 104 and an erroneous memory location will be selected.

In lines C and D, the signals which are applied to the permiss gates for passing the instruction words are shown. Thus, in line C a pulse extends from time period $t_7$ to time period $t_{27}$. It will be clear that this pulse is available only coincidentally with digits 2, 3 and 4 of the instruction words. Therefore, this pulse would be utilized when a machine is to be operated in the first (machine 102) mode of operation, viz. incorporating the memory address code utilizing digits 2, 3 and 4 of the instruction word. In line D, a permiss signal is shown which extends from time period $t_7$ to time period $t_{34}$. It will be seen that this signal is coextensive with digits 2, 3, 4 and 5. Clearly then, this permiss signal is utilized when the machine is operating in the Univac II mode of operation which uses digits 2 through 5 for the memory code address.

In view of the discussion of the instruction words shown in FIGURE 2, it becomes exceedingly clear that the problem which is encountered in the system shown in FIGURE 1 is that machine 104 which utilizes input information in the form of instruction words from input apparatus 100 will receive information following the coded formats of both instruction words (lines A and B) in accordance with the particular set-up involved in input apparatus 100. That is, since machine 104 has a larger memory system, and can accommodate a larger memory address code, it is normally controlled by the permiss signal shown in line D in FIGURE 2. However, since some of these input signals are in the form of the instruction word shown on line A of FIGURE 2, the extended permiss signal produced by machine 104 will provide erroneous memory address information. (Such a problem will not occur in machine 102 provided the memory digits 2, 3 and 4 are identical in both cases, as described supra, in view of the fact that machine 102 has only a limited memory system and a permiss signal which permits only the number of memory code address digits to be applied as are necessary to identify each of the memory addresses in the system. That is, the extra digit will not be passed by the input gate.)

Thus, it becomes necessary to provide a means for altering the length of the permiss signal which is generated in machine 104. This flexibility is provided by the compatibility circuit 106 as is shown in FIGURE 1.

It should be fully explained and clearly understood that the foregoing description of the instruction word is not to be limitative of the invention. That is, the instruction word may in fact comprise a larger or smaller number of digits and each of the digits may comprise a larger or smaller number of binary bits. However, so long as there is a difference in the number of digits and/or bits utilized to identify a particular memory address, the compatibility circuit, which is the subject of this invention and described subsequently, is still very much desirable and in many cases extremely necessary for efficient and proper operation of the machines.

Figure 3:
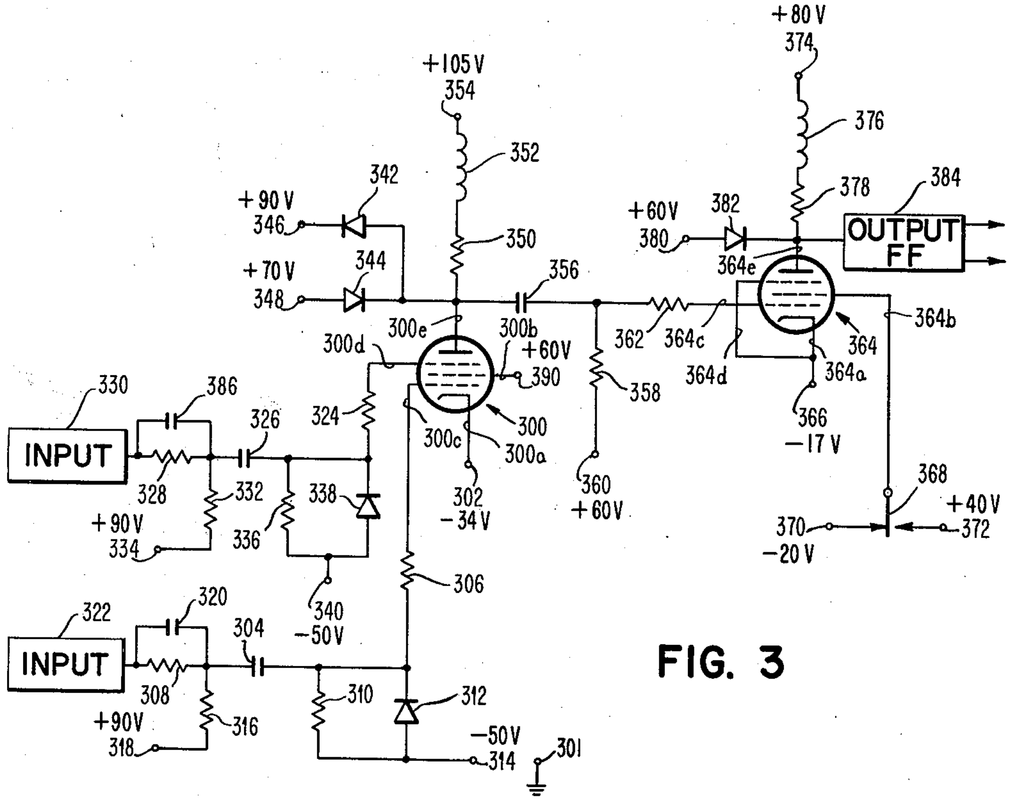
FIGURE 3 is a schematic drawing of a compatibility circuit which is the subject of this invention.

Referring now to FIGURE 3, there is shown a schematic diagram of the compatibility circuit which represents the subject of this invention. In this circuit, a dual-control pentode 300, for example a Sylvania type 7AK7 pentode, has the cathode 300*a* returned to a negative potential source 302. This source 302 may be for example −34 volts. This potential, as well as all others shown and suggested, are relative to ground potential, as suggested by terminal 301. The second or screen grid 300*b* is connected to a source 390 which provides a potential of +60 volts for example. The first and third grids 300*c* and 300*d* respectively are connected to input sources by virtually identical networks. Each of the input networks connected to grids 300*c* and 300*d* respectively comprise similar elements. The only differentiation between the two networks is that some of the components have somewhat different values than the components in the other networks. The input network connected to grid 300*c* comprises resistor 306 (330 ohms) which is connected in series with capacitor 304 (0.03 μfd.) and resistor 308 (27K ohms). At the junction between resistor 306 and capacitor 304, there is connected a parallel branch comprising resistor 310 (150K ohms) and diode 312. A typical diode is 1N48 and, in fact, two diodes may be inserted in series to provide sufficient reverse voltage drop. These components are connected in parallel and connected to source 314 which may be for example −50 volts. At the junction between capacitor 304 and resistor 308, resistor 316 (150K ohms) is connected at one end thereof. The other end of resistor 316 is returned to source 318 which may be for example +90 volts. Capacitor 320 (68 μμfd.) is connected in parallel with resistor 308. Since input source 322 is connected to the resistor 308, signals applied by source 322 are the signals which control the grid 300*c* of tube 300. The input network connected to grid 300*d* of tube 300 is very similar to the input network connected to grid 300*c*. Thus, resistor 324 (330 ohms) is connected in series with capacitor 326 (0.03 μfd.) and resistor 328 (22K ohms). This series network is connected to input source 330 whereby input signals are supplied from input source 330 to grid 300*d* of tube 300. As in the case of the other input network, resistor 332 (150K ohms) is coupled between potential source 334, which may be for example about +90 volts, and the junction between capacitor 326 and resistor 328. The potential source 340 which may be for example −50 volts is connected to the junction between capacitor 326 and resistor 324 via the parallel branch comprising the resistor 336 (150K ohms) and diode 338. Again, a typical diode is 1N48 and two diodes in series may be included as desired.

The anode 300*e* of tube 300 is connected to different electrodes of diodes 342 and 344. Specifically, diode 342 has the anode thereof connected to the anode of tube 300 and the cathode thereof connected to source 346 which may be for example about +90 volts. The diode 344 has the cathode thereof connected to the anode of tube 300 and the anode of the diode connected to a source 348 which may be for example +70 volts. It will be seen that the anode of tube 300 is effectively clamped between +70 and +90 volts (assuming these are the potentials supplied by the sources 346 and 348). The anode of tube 300 is further connected to the source 354 which may be for example +105 volts via inductor 352 (91 μhenries) and resistor 350 (2.2K ohms). Also connected to the anode 300*e* of tube 300 is the blocking capacitor 356. This capacitor may be on the order of 1000 picofarads. The ratings of this capacitor are determined such that the signal produced at the anode of tube 300 (described subsequently) is not differentiated by capacitor 356 in conjunction with resistor 358 (150K ohms) which is connected between capacitor 356 and source 360 which may be on the order of +60 volts. The junction between capacitor 356 and resistor 358 is connected to resistor 362 (1000 ohms). The other end of resistor 362 is connected to the first grid of beam power pentode 364 which may be for example a 25L6 pentode type tube. The source 360 which may be about +60 volts applies bias potential to the first grid of the pentode 364 via resistors 358 (150K ohms) and 362 (1000 ohms), the ratings of which are so chosen that the grid current is approximately 0.5 milliampere. The third grid 364*d* of tube 364 is connected to cathode 364*a* each of which are then connected to the source 366 which may be for example −17 volts. The second grid 364*b* of tube 364 is connected to a switch 368 which controls the mode of operation of the circuit. This switch is represented schematically as a single pole double throw switch which can interconnect the grid 364*b* of tube 364 to either of the two sources 370 or 372 respectively. When connected to source 370, a potential which may be for example about −20 volts is applied to grid 364*b* whereby tube 364 is rendered cutoff and maintained in that condition regardless of the input signals applied to grid 364*c* via capacitor 356. In the alternative, however, when the switch 368 is connected to source 372, a potential of approximately +40 volts is applied to grid 364*b* whereby the tube 364 is rendered conductive and is adapted to produce output signals at the anode thereof in accordance with input signals supplied on input grid 364*c*. The anode 364*e* of tube 364 is connected to a potential source 374 which may be for example +80 volts via the series branch comprising resistor 378 (680 ohms) and inductor 376 (10 μhenries). Moreover, the anode 364*e* is connected to a further source 380 which may be on the order of +60 volts via diode 382 (typically a 1N48) thereby effectively clamping the anode 364*e* to a low level signal of about +60 volts. An output device 384 is also connected to the anode 364*e*. The output device 384 is schematically shown as a flip-flop. This flip-flop is the device which regulates the length of the permiss signal which is supplied to the appropriate logic circuits and allows the passage of the digits of the instruction words as described supra. Clearly, the component values are exemplary only and are not limitative of the scope and principles of the invention.

In essence, the operation of the circuit herein described is to provide a pulse at time period $t_{28}$, which pulse will reset the flip-flop 384 whereby the permiss signal which is generated will be reset or cutoff. The $t_{28}$ signal which is to be supplied to flip-flop 384 is generated in accordance with the following circuit operation. The input signals supplied by input sources 322 and 330 respectively are in the form of positive going pulses which are on the order of about +20 volts and are supplied from delay line cycling loops. These cycling loops or units each each have different delay times and supply pulses at different predetermined periods. For example, the cycling unit which is attached to terminal 322 generates a pulse once every 7 pulse lengths or time periods. That is, a pulse is generated by the cycling unit. This pulse then travels through the delay line (or for example in the case of a magnetic tape will be read off the tape as the tape moves) and the previously generated pulse is regenerated again every 7 pulse times later. The number of pulse times between the generation and regeneration of the input pulse is not limited to 7 pulse lengths. The illustrative number of 7 pulse lengths is related to the number of binary bits utilized in each digit of the instruction word which is being operated upon by the circuit. Similarly, the pulse applied to terminal 330 via a further cycling unit will generate and regenerate the input pulse, for example, with 13 pulse lengths between pulses. The reason for providing, in this example, a 13 pulse time delay between the generation and regeneration of pulses in the second cycling unit is determined by the fact that the Univac normally utilizes an instruction word having two 6 digit instruction words in seriatim and a single spacer digit attached thereto. Thus, there are 91 binary bits in an instruction word. By surveying a precession chart which shows the times when there is a coincidence of pulses from both of the cycling units at the same time periods, it will be seen that cycling units 7 and 13 pulse lengths delay provide only one coincident pulse at a particular location in every 91 pulse lengths of delay. Thus, there is a relationship between the timing of the cycling unit in regard to the digit length and the instruction word length.

Assuming first that the pulses supplied by the cycling units are not coincidental, and further assuming that the pulse supplied by the 7 pulse lengths delay cycling unit would be supplied first, it will be assumed that a pulse is applied to terminal 322. This pulse will be in the nature of a positive going pulse and will be on the order of +20 volts. This +20 volt pulse will pass through the input network connected to grid 300*c* and raise this grid potential by 20 volts. However, inasmuch as the tube 300 requires that the potential at both grids 300*c* and 300*d* be raised by a positive potential before the tube will conduct, it will be seen that there will be no change in the conduction state of tube 300. Inasmuch as the tube 300 is not rendered conductive, the anode thereof remains clamped to +90 volts. Moreover, the capacitor 356 will not pass the D.C. potential thereat whereby the grid 364*c* of tube 364 is maintained at approximately —11 volts. The conductive condition of tube 364 is dependent upon the alignment of switch 368 as will be discussed subsequently.

Assuming now that the signals supplied by the 7 pulse cycling unit and the 13 pulse cycling unit are supplied to terminal 322 and 330 coincidentally, it will be seen that pulses will be applied to both grids 300*d* and 300*c.* With the application of these positive going signals to both of these grids, the tube 300 will be rendered conductive. When tube 300 conducts, the anode 300*e* will drop in potential. However, this potential drop will be limited to a net change of about —20 volts due to the fact that the lower limit of the anode potential is clamped at +70 volts by diode 344 which is connected to source 348. However, as the tube conducts and the anode potential falls, the negative going pulse is provided at the anode of tube 300. This pulse is representative of the coincidence of the two signals supplied by the input cycling units. It is further to be understood that the cycling units and the sub-cycles thereof have been so chosen that the coincidence of pulses is selected for time period $t_{28}$. By so selecting the cycling and sub-cycling routines, the pulse which is provided at the anode 300*e* of tube 300 is the pulse which will (if properly adapted) trigger the flip-flop 384 thereby resetting the flip-flop such that the permissive signal produced thereby is terminated at time period $t_{28}$ such that decoding of further digits from the memory address code portion of the instruction word are inhibited.

It was previously shown that in the absence of coincident signals at the input, there was no change in the anode 300*e* of tube 300 and no change in the conduction of tube 364. Assuming now, the alternative condition, viz. that the input signals are coincident whereby a negative going pulse of approximately —20 volts magnitude is produced on the anode 300*e*, it will be seen that the changing signal will pass through capacitor 356 onto grid 364*c* of tube 364. The importance of this signal is determined by the alignment of switch 368. Thus, if switch 368 is aligned so that it is connected to source 370, a —20 volts source, tube 364 is biased into the off or non-conducting state regardless of the nature of the signal applied to grid 364*c.* This switch arrangement is indicative of the fact that the machine is operating in the machine 104 (see FIGURE 1) mode and that the input information is being supplied to the machine in accordance with the coding and programming associated therewith. In the alternative, assuming that machine 104 is operating in machine 102 mode, that is with the input apparatus, including soft-ware, operating with the characteristics associated with machine 102, switch 368 is connected to source 372. This arrangement applies a +40 volt potential on grid 364*b* whereby tube 364 is rendered conductive. When the tube 364 is conductive, the anode 364*e* is maintained at about +60 volts by means of source 380 and diode 382. With the application of a negative going pulse on the order of —20 volts to grid 364*c*, tube 364 is rendered non-conductive or turned off. This permits the anode 364*e* of the tube to rise toward the potential of +80 volts applied by source 374 via inductor 366 and resistor 378. The inductors 376 and 352 are utilized in order to provide better rise time characteristics for the pulse output at the anodes 364*e* and 300*e* respectively. As the signal at anode 364*e* approaches +80 volts, it may be seen that a pulse of approximately +20 volts is applied to the flip-flop 384. As previously discused, this pulse is applied to the reset terminal of the flip-flop 384 whereby the signal produced thereby is altered. Consequently, in response to the input signal at flip-flop 384 the output signal at terminal 384*a* is switched from the high to the low state thereby inhibiting the gate through which the instruction word had previously been passed. The external circuitry is omitted for purposes of clarity and conciseness insofar as this circuitry is relatively standard and is not related to the invention, per se.

Figure 4:
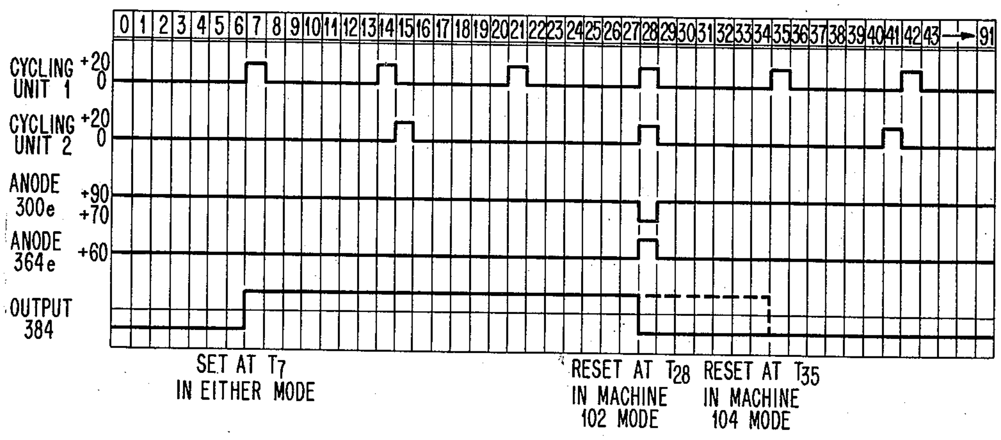
FIGURE 4 is a graphical showing of the pulses supplied to and by the circuit.

Referring briefly to FIGURE 4, there is shown a graphical representation of the waveforms and pulse forms throughout the circuit and at various time periods. Thus, it is seen that the cycling units 322 and 330 respectively provide pulses which are seven and thirteen time periods apart. So long as these pulses are not coincident, the anode 300*e* resides at +90 volts. Similarly, anode 364*e* resides at a potential of +60 volts. Though not necessarily set by the pulse shown generated by cycling unit 322 at time period $t_7$, the output 384*a* of flip-flop 384 is shown for sake of example as having been set at time period $t_7$. It is further shown that at time period $t_{28}$, the pulses supplied by both cycling units are finally coincident. This coincidence of pulses causes tube 300 (see FIGURE 3) to conduct whereby the potential at the anode 300*e* drops from +90 to +70 volts. At the same time, this drop in potential is transmitted to the grid 364*e* of tube 364 (see FIGURE 3) whereby tube 364 is cut off and anode 364*e* experiences a potential rise from approximately +60 to approximately +80 volts. (It is to be understood of course that this rise in potential exists only when the machine 104 is being operated by input apparatus and soft-ware following machine 102 procedures.) Moreover, the application of the pulse produced on anode 364*e* to the output flip-flop 384 produces the change in the output signal at 384*a* whereby the gates following thereafter are reset or inhibited.

The signal portion shown dashed in FIGURE 4 represents the output signal produced by flip-flop 384 under normal operating conditions. That is, without the use of the compatibility circuit shown in FIGURE 3, a machine operating in the machine 104 mode will normally have a permiss signal which exists until $t_{34}$ because of the instruction word format as shown in FIGURE 2. When the machine is operating in the machine 102 mode, with the compatibility circuit incorporated, the permiss signal exists only until $t_{28}$ as discussed supra. Therefore, the dashed signal is shown to illustrate the distinction between the permiss signals provided under different operating conditions.

It is to be understood, that the foregoing description of the circuit and its operation is not to be limitative of the invention. Further, the circuit shown is one specific embodiment of the inventive concepts involved. Changes in many of the components and their values as may occur to those skilled in the art are meant to be included within the principles of this invention. Thus, so long as two machines having different memory storage capacities are being operated in association with a single input source which can be supplying information relating to the machine having the smaller memory capacity, a circuit similar to that suggested herein is required. Circuits using similar principles to those described are meant to be included within the scope of this invention.

Having thus described the invention, what is claimed is:

1. In combination,
first pulse producing means characterized by a predetermined cycling period,
second pulse producing means characterized by a different predetermined cycling period,
the cycling periods of said first and second pulse producing means so related that said pulse producing means produce coincident pulses at predetermined times,
first valve means connected to each of said first and second pulse producing means,
said first valve means adapted to reside in a first conduction state until switched to another conduction state by the simultaneous application of pulses by said first and second pulse producing means,
second valve means,
means connecting said first and second valve means together so that the change in conduction state of said first valve means may be sensed by said second valve and output signals selectively produced thereby,
and switching means connected to said second valve means to control the conduction state thereof thereby selectively controlling the production of output signals thereby.

2. In combination,
first pulse producing means characterized by a predetermined cycling period,
second pulse producing means characterized by a different predetermined cycling period,
said first and second pulse producing means adapted to provide simultaneous signals at a predetermined period,
first pentode means having different grid electrodes thereof connected to each of said first and second pulse producing means via A.C. coupling means,
said first pentode means adapted to reside in a first conduction state until switched to another conduction state by the simultaneous application of pulses by said first and second pulse producing means,
second pentode means,
switching means connected to said second pentode means to control the conduction state thereof,
and A.C. coupling means connecting said first and second pentode means together so that the change in conduction state of said first pentode means may be sensed by said second pentode and output signals selectively produced thereby.

3. In combination,
first input means having one recurrence pattern,
second input means having another recurrence pattern,
first electronic amplifier means,
said first and second input means connected to said first amplifier means to periodically provide simultaneous signals at predetermined times in accordance with said recurrence patterns,
second electronic amplifier means, A.C. coupling means connected between said first and second amplifier means,
control means coupled to said second electronic amplifier means to control the operation thereof and the responsiveness thereof to signals produced by said first electronic amplifier means in response to the application of simultaneous signals thereto,
and means for selectively supplying output signals from said second amplifier means in accordance with the operation thereof as controlled by said control means.

4. In combination,
first pulse producing means characterized by a predetermined cycling period,
second pulse producing means characterized by a different predetermined cycling period,
first valve means connected to each of said first and second pulse producing means,
said first valve means adapted to be nonconductive until switched to the conduction state by the simultaneous application of pulses by said first and second pulse producing means,
second valve means,
means connecting said first and second valve means together so that the change in conduction state of said first valve means may be sensed by said second valve,
switching means connected to said second valve means to control the conduction state thereof thereby selectively controlling the production of output signals thereby,
and means for supplying output signals from said circuit at a time determined in accordance with the input signals provided by said first and second cycling units.

5. In combination, a first amplifier tube, first and second source means, switch means connected to said first amplifier tube and to one of said first and second source means alternatively, said first source means operative to render said first amplifier tube nonconductive and said second source means operative to render said first amplifier conductive when connected thereto by said switch means, a second amplifier tube, A.C. coupling means connected between said first and second amplifier tubes in order to pass a changing signal from said second tube to said first tube and to block D.C. signals therebetween, first input means connected to said second amplifier tube, second input means connected to said second amplifier tube, said first and second input means each operative to produce a regularly recurring input signal at different frequencies such that the input signals produced by said first and second input means occur simultaneously only at predetermined times which are a function of the frequencies of recurrence of the input signals, bias means connected to said second amplifier tube to render said second amplifier tube nonconducting in the absence of simultaneous input signals from said first and second input means, said second amplifier tube operative to produce a changing signal in response to simultaneous input signals from said first and second input means, said changing signal being supplied to said first amplifier tube via said A.C. coupling means in order to render said first amplifier tube nonconductive only when said first amplifier tube was previously rendered conductive by connection to said second source means by said switch means, and output means connected to said first amplifier means, said output means having two alternative operating states which are indicative of the conduction and nonconduction of said first amplifier.

6. In combination, a first pentode tube, first and second source means, switch means connected to one grid electrode of said first pentode tube and to one of said first and second source means alternatively, said first source means operative to render said first pentode tube nonconductive and said second source means operative to render said first pentode conductive when connected thereto by said switch means, a second pentode tube, A.C.

coupling means connected between said first and second pentode tubes in order to pass only a changing signal from said second pentode tube to said first pentode tube, first input signal producing means connected to said second pentode tube, second input signal producing means connected to said second pentode tube, said first and second input signal producing means each operative to produce a regularly recurring input signal at different rates such that the input signals produced by said first and second input signal producing means occur coincidentally only at predetermined times which are a function of the rates of recurrence of the input signals, bias means connected to said second pentode tube to render said second pentode tube nonconducting in the absence of coincident input signals from said first and second input signal producing means, said second pentode tube operative to produce a changing signal only in response to coincident input signals from said first and second input signal producing means, said changing signal being supplied to said first pentode tube via said A.C. coupling means in order to render said first amplifier tube nonconductive such that a change in conduction is exhibited by said first pentode tube only when previously rendered conductive by connection to said second source means by said switch means, and output means connected to said first pentode means, said output means comprising a flip-flop circuit having two alternative operating states which are indicative of the conduction and nonconduction of said first amplifier.

References Cited by the Examiner

UNITED STATES PATENTS 2,600,744 6/52 Eckert et al. ____________ 328—93

ARTHUR GAUSS, *Primary Examiner.*

GEORGE W. WESTBY, *Examiner.*